Nov. 15, 1932.  R. A. FURLONG  1,887,632
VISIBLE INDEX CARD
Filed June 27, 1930  3 Sheets-Sheet 1
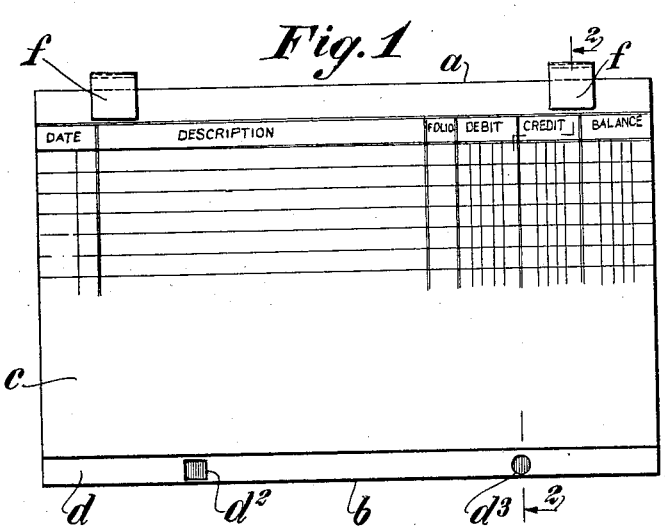
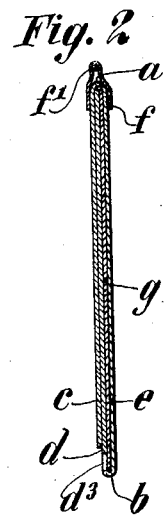
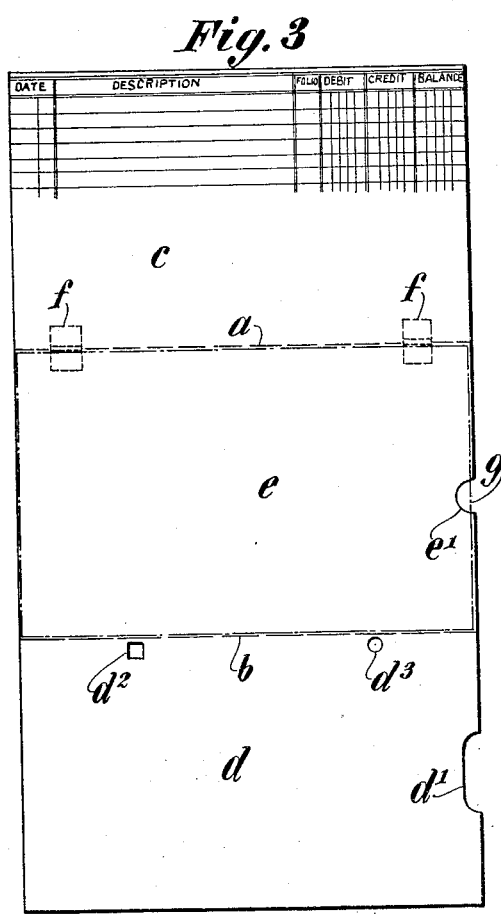
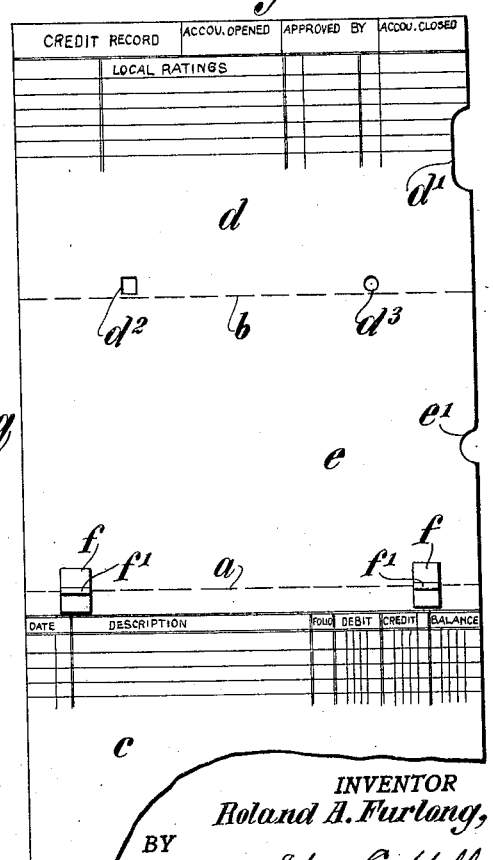
INVENTOR
Roland A. Furlong,
BY
Redding, Greeley, O'Shea & Campbell
HIS ATTORNEYS Nov. 15, 1932.  R. A. FURLONG  1,887,632
VISIBLE INDEX CARD
Filed June 27, 1930  3 Sheets-Sheet 2
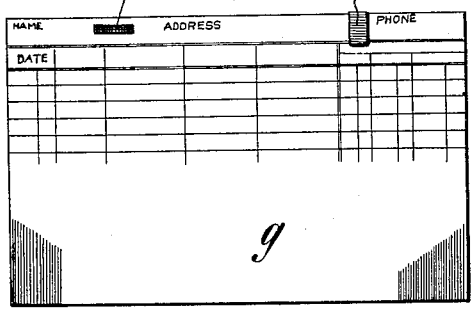
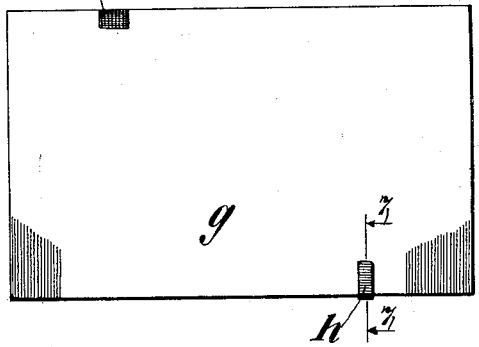
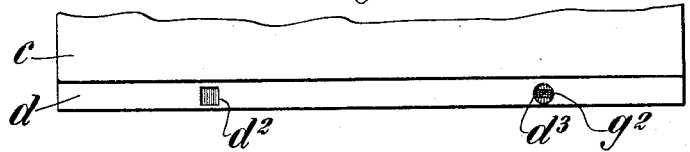
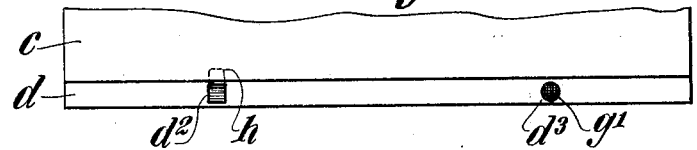
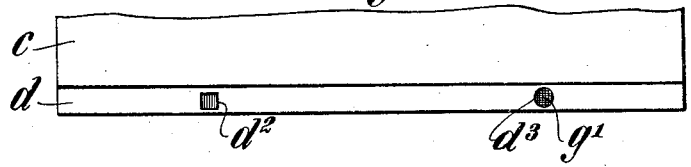
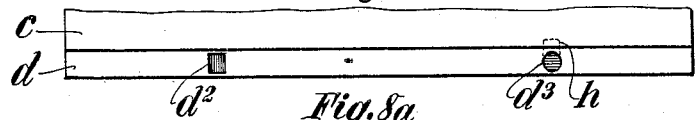
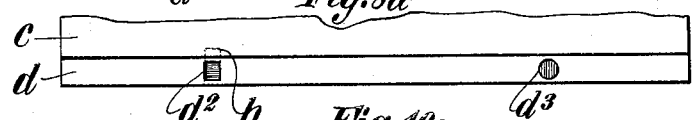
INVENTOR
Roland A. Furlong,
BY
Redding, Greeley, O'Shea & Campbell
HIS ATTORNEYS Nov. 15, 1932.   R. A. FURLONG   1,887,632
VISIBLE INDEX CARD
Filed June 27, 1930   3 Sheets-Sheet 3
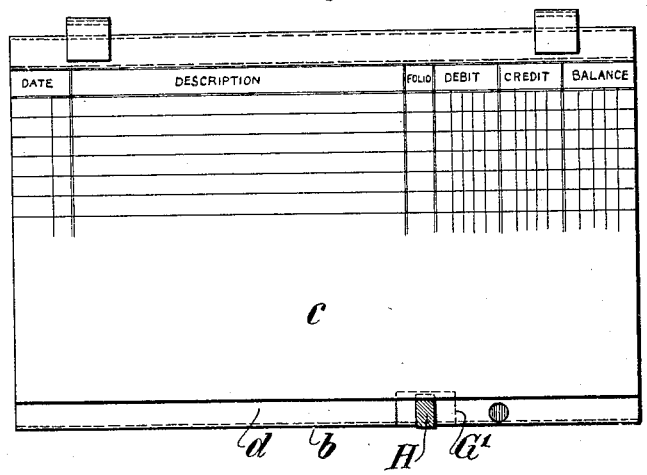
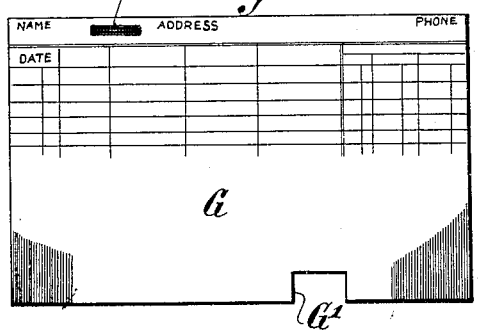
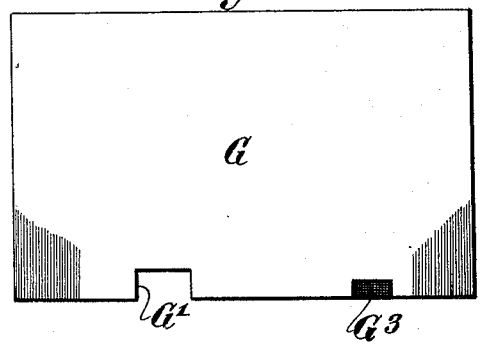
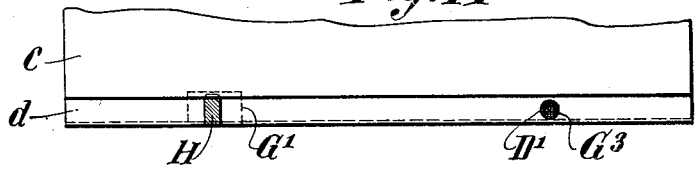
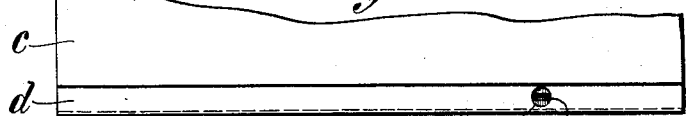
INVENTOR
Roland A. Furlong,
BY
Redding, Greeley, O'Shea & Campbell
HIS ATTORNEYS Patented Nov. 15, 1932

1,887,632

UNITED STATES PATENT OFFICE

ROLAND A. FURLONG, OF ROCHESTER, NEW YORK, ASSIGNOR TO THE YAWMAN & ERBE MANUFACTURING COMPANY, OF ROCHESTER, NEW YORK, A CORPORATION OF NEW YORK

VISIBLE INDEX CARD

Application filed June 27, 1930. Serial No. 464,166.

This invention relates to improved visible index cards of such a character as to be readily engaged and disengaged with the card holder, of convenient size when mounted in a card tray, of great superficial area to afford large capacity for notations thereon, susceptible of manipulation to give a great number of signal indications when in the tray and constituting a carrier for an auxiliary card which may be engaged therewith or removed therefrom conveniently. Other objects of the invention have to do with the means by which the multiplicity of signal indications are conveniently obtained by the relationship of the auxiliary card and coacting signal means on the improved master card and also in one specific form the provision in the auxiliary card of means to permit its ready association with the master card without interference with a signal clip which may be attached thereto.

More particularly, the invention is concerned with a two-fold three-sheet master card all of the faces of which are available to receive notations, while the sheets may be folded to overlie, thus bringing the master card to the size of one sheet only, as is desirable when it is to be mounted in a tray. The folded sheets are engaged by hinge members by which the card may be readily attached to or detached from a card holder. When folded the sheets constitute an open-ended envelope into which can be readily slid an auxiliary card which will be retained by the sheets in the tray. The uppermost sheet of the master card when folded is shorter than the sheet lying thereunder so that the lower edge of the latter may constitute a tab for the entire card. In the exposed portion of this tab may be formed one or more windows through which the auxiliary card may be viewed when inserted. On the auxiliary card may be provided a plurality of signals either permanently or detachably which may be exposed through the windows in the tab in varying combinations depending on which face and which edge of the auxiliary card is visible, thereby affording as great a number and variety of signal indications as is desirable.

The invention will be described more particularly in connection with the embodiments illustrated in the accompanying drawings, in which:

Figure 1 is a view in plan of the improved master card showing it folded to its normal condition for an attachment to a card holder.

Figure 2 is a view in section on the planes indicated by the broken line 2—2 of Figure 1 and looking in the direction of the arrows.

Figure 3 is a view of the improved card with the sheets unfolded to expose their faces.

Figure 4 is a view showing the reverse side of the card illustrated in Figure 3.

Figure 5 is a view of one side of a suitable auxiliary card for association with the improved master card.

Figure 6 is a view of the reverse side of the card shown in Figure 5 with the top and bottom edges inverted.

Figure 7 is a detail view in section through a detachable signal clip taken on the plane indicated by the line 7—7 of Figure 6 and looking in the direction of the arrows.

Figures 8–10a show the variety of combinations of signal indications obtainable by association of the auxiliary card with the master card.

Figure 11 is a view in plan of the improved master card with an auxiliary card associated therewith formed with a slot at one edge to permit the use of a signal clip on the master card without securing the auxiliary card thereto.

Figure 12 is a view of such an improved auxiliary card having such a slot.

Figure 13 is a view of the reverse face of the card shown in Figure 12.

Figure 14 is a view similar to Figure 11 showing a fragment of a master card with the auxiliary card inserted in the position shown in Figure 13.

Figure 15 is a view of a fragment of the master card with the card shown in Figure 12 in place therein with its upper and lower edges inverted.

As shown in Figures 3 and 4 the master card is formed from a single sheet of paper which may be folded at $a$ and $b$ so as to constitute, in effect, three cards of ordinary size. The entire sheet may be placed in a typewriter and notations made on any part of either side, the result being a very extended superficial surface to receive these notations. When the card is folded it takes the form illustrated in Figure 1 which is essentially that of a single card. In that condition the uppermost sheet $c$ is of such a length as to leave exposed the underlying card section $d$ along its lower edge, this exposed portion being suitable for use as a tab. When thus folded the intermediate section $e$ of the card constitutes the lowermost section. Hinge members $f$ of any suitable form may be attached to the upper and lower sheets $c$, $e$, adjacent the fold line $a$, these hinges being preferably of flexible fabric glued directly to the cards. An enlarged part $f'$ of the hinged elements may be engaged with card holders.

The folded master card constitutes an open-ended envelope into which may be slid an auxiliary card $g$, this card being retained by the master card when in the tray. Scallops $e'$ and $d'$ in the sheets $e$ and $d$, respectively, are in registry when the sheets are folded and these scallops expose the auxiliary card $g$ to the finger and thumb so as to facilitate its withdrawal.

The sheet $d$ of the master card may have formed therein one or more windows in the surface which remains exposed when the sheets are folded. In the embodiment shown in the drawings a circular window $d^3$ is illustrated in the tab section at one side of the center and a square window $d^2$ at the other side. These windows are for the purpose of permitting the prominent display of signals to indicate some particular status of the master or auxiliary card. Figures 8–10a illustrate various signal combinations, any one or all of which may be found most useful in practice. Let it be assumed that the auxiliary card $g$ shown in Figures 5 and 6 is of a distinctive color, pink being illustrated. When this card is slid into the open-ended envelope formed by the folded sheets of the master card its color (pink) will be observed through both windows $d^3$, $d^2$, as illustrated in Figure 1. This condition exists when the card $g$ rests within the master card in the position in which it is illustrated in Figure 5. This may be taken as a normal signal. To indicate a different status of the card a spring clip $h$ may be attached to its lower edge, as viewed in Figure 5, in such position laterally as to be exposed to view through the left-hand window $d^2$. Such a condition is shown in Figure 8a the clip being illustrated as blue in color and the pink of the card showing through the other window $d^3$. These indications will be reversed by pressing the clip $h$ on the card so that it will be exposed to view through the window $d^3$, pink then showing through the window $d^2$. This is illustrated in Figure 8b. On one face of the card as shown in Figure 6 adjacent one edge thereof (the top edge as viewed in Figure 6) the card $g$ may have been printed with a small solid colored signal such as $g'$. The color shown in the drawings is black. By turning the card in its own plane upside-down as viewed in Figure 6 and then inserting it in the envelope this black signal $g'$ will show through the window $d^3$ while the pink of the card will appear in the other window $d^2$. This combination is shown in Figure 10. By applying a spring clip of distinctive color, such as was referred to above, to the same edge of card as bears the black signal $g'$, this blue signal may be exposed to view through the window $d^2$ at the same time that the black signal $g'$ is exposed at $d^3$. This condition is shown in Figure 9. On the other side of the card $g$ adjacent one edge, as illustrated in Figure 5, may be printed a narrow, distinctively colored, signal indicated at $g^2$. This is shown as black in color. It is of less width than the diameter of the window $d^3$. By inverting the edges of the card shown in Figure 5 and inserting the card in the master card, this signal $g^2$ will be exposed to view through the window $d^3$ as illustrated in Figure 8 while the pink color of the card will show through the other window $d^2$. By attaching a distinctively colored clip to the edge of the auxiliary card $g$ in such a position that it will be exposed to view through the window $d^2$ while the signal $g^2$ is exposed to view through the window $d^3$, still another combination is obtained, as shown in Figure 10a wherein the signal is indicated as blue. An even greater variety of signal combinations may be thus worked out by the simple card structures disclosed through selection of one of a plurality of distinctively colored spring clips.

Under some circumstances it may be advisable to apply a spring clip to the improved master card at some point along its lower edge when the sheets are folded. Such a clip is illustrated in Figures 11 and 14 by the reference character H. Such a spring clip, when present, would secure the sheets $d$ and $e$ together at their fold $b$ and prevent the ready insertion and removal of an auxiliary card. To meet this condition the auxiliary card G, shown in Figures 12 and 13, has a cut-out as at G' along its lower edge, designed to span such a clip as H when the auxiliary card is inserted between the sheets of the master card. This appears clearly in Figures 11 and 14 where the cut-out is shown in dotted lines. By throwing up the topmost sheet $c$ of the master card the auxiliary card G may be grasped at its upper edge and pulled out despite the fact that the sheets $d$ and $e$ are embraced by the clip H. When the auxiliary card G is reversed, as shown in Figure 13, the spring clip H may be applied at a point to be spanned by the cut-out G'.

Figure 15 illustrates a condition where the signal H has been removed. In Figures 14 and 15 only one window D' is provided and this may be sufficient under many conditions since it will give a variety of at least three signals, if desired. That is, when an auxiliary card G is placed in the master card, its color will be viewed through the window D' and this is normal. When the card has its edges inverted, distinctively colored signal G² may be exposed to view through the window D', as shown in Figure 15, whereon the signal G² is narrower than the window. By reversing the card a signal on the other face, as indicated at $g^3$, may be exposed to view, as shown in Figure 14, this signal being of sufficient size so that its color alone shows.

What I claim is:

1. A visible index card consisting of three sheet sections adapted to be folded to overlie one another, the uppermost sheet section being of less length than the sheet section thereunder, and the last-named sheet section having a signal window exposed to view beneath the lower edge of the overlying sheet section.

2. A visible index card consisting of three sheet sections adapted to be folded to overlie one another, the uppermost sheet section being of less length than the sheet section thereunder, the last-named sheet section having a signal window exposed to view beneath the lower edge of the overlying sheet section, and an auxiliary card insertable between the overlying sheet sections.

3. A visible index card consisting of three sheet sections adapted to be folded to overlie one another, the uppermost sheet section being of less length than the sheet section thereunder, the last-named sheet section having a signal window exposed to view beneath the lower edge of the overlying sheet section, and an auxiliary card insertable between the overlying sheet sections, said auxiliary card being provided with a signal observable through said window.

4. A visible index card consisting of three sheet sections adapted to be folded to overlie one another, the uppermost sheet section being of less length than the sheet section thereunder, the last-named sheet-section having a signal window exposed to view beneath the lower edge of the overlying sheet section and an auxiliary card having one or more signals on each of its faces at its top and bottom edges for display in different combinations through said windows.

5. A visible index card consisting of three sheet sections adapted to be folded to overlie one another, the uppermost sheet section being of less length than the sheet section thereunder, and an auxiliary card insertable between the folded sheet sections and having a cut-out portion at one edge.

6. A visible index card consisting of three sheet sections adapted to be folded to overlie one another, the uppermost sheet section being of less length than the sheet section thereunder, and a signal window in the last-named sheet section exposed to view beneath the lower edge of the overlying sheet section, and an auxiliary card insertable between the folded sheet sections and having a cut-out portion at one edge.

7. A visible index card consisting of a plurality of sheet sections folded to overlie one another, one of said underlying sheet sections having means for attachment of the card to a card holder and an overlying sheet section having a signal window exposed to view, and an auxiliary card insertable between the two said sheet sections.

This specification signed this 24th day of June A. D. 1930.

ROLAND A. FURLONG.